Dec. 15, 1970
T. MARTON
3,546,961
VARIABLE FLEXIBILITY TETHER
Filed Dec. 22, 1967
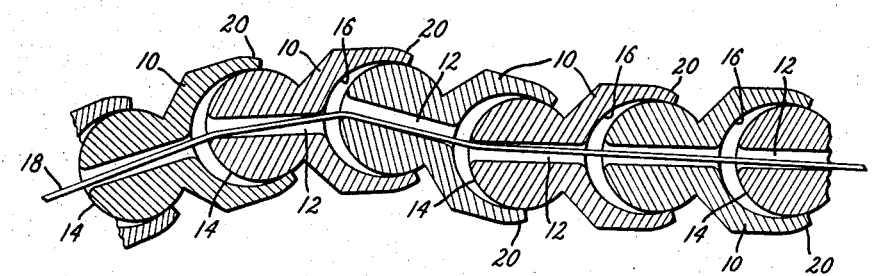
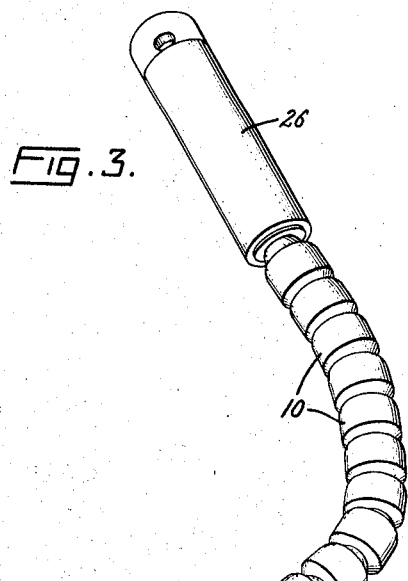
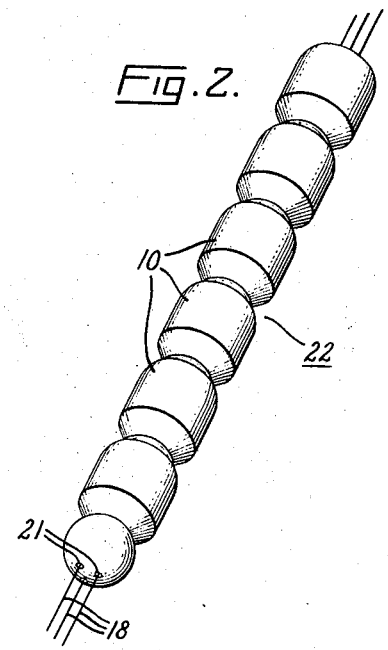
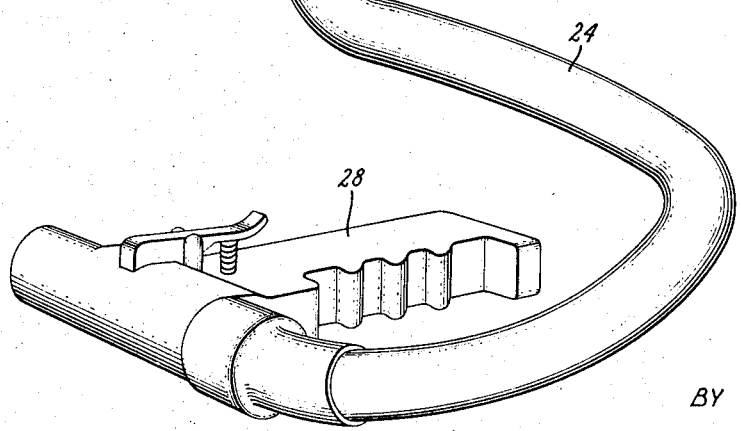
INVENTOR:
THEODORE MARTON,
BY Paul F. Prestia
ATTORNEY United States Patent Office 3,546,961
Patented Dec. 15, 1970

3,546,961
VARIABLE FLEXIBILITY TETHER
Theodore Marton, Roosevelt, N.J., assignor to General Electric Company, a corporation of New York
Filed Dec. 22, 1967, Ser. No. 692,925
Int. Cl. F16c 1/10
U.S. Cl. 74—501                                        6 Claims

ABSTRACT OF THE DISCLOSURE

A variable flexibility tether for attaching and supporting bodies in space or under water comprises a control cable passing through a plurality of members each having a concave surface on one end thereof and a convex surface on the opposite end thereof, each of said surfaces abutting oppositely curved surfaces of adjoining members. When tension is applied to the control cable, adjoining members are forced into mechanical engagement with one another and the tether becomes rigid. When the members are not engaged, the tether is flexible, i.e. it will bend freely. An overhanging lip on the concave abutting surfaces prevents complete separation of adjoining members in the preferred form of the present invention. In one embodiment of the invention, multiple control cables are used to effect manipulation as well as rigidification of the tether.

INTRODUCTION

The present invention relates to methods and means for attaching, supporting, and retarding or preventing the relative movement of bodies in unusual environments in which the force of gravity is substantially reduced or nullified. More specifically, the invention relates to a tether for connecting a body to a space or underwater vehicle, which tether may be made rigid or flexible depending upon the immediate need.

BACKGROUND OF THE INVENTION

In outer space, in planetary orbit or in an underwater environment, three-dimensional movement of a body relative to a space or underwater vehicle is sometimes required. Nevertheless it is desirable to maintain a connecting link, known as a tether, with the vehicle. Further, there is often a need for a means to prevent or to retard the movement of a movable body relative to the vehicle. If a flexible or freely bendable tether is used, three-dimensional movement is not impaired. On the other hand, if the tether is rigid all such movement is impaired.

It is therefore an object of the present invention to provide a tether which may be both flexible and rigid.

It is another object of the present invention to provide a flexible tether for connecting a space or underwater vehicle to a body which permits relative movement of that body, but which when needed can be rigidified to prevent such relative movement.

More specifically, it is an object of the present invention to provide a tether having controllable flexibility and rigidity.

Another object of this invention is to provide a variable flexibility tether with means for manipulating one of the ends thereof to cause relative movement of one of the tethered bodies.

Still another object is to provide a variable flexibility tether which rigidifies in a curvilinear position.

A further object of this invention is to provide a method of using a structure by which a body may be either flexibly or rigidly connected to a space or underwater vehicle.

BRIEF SUMMARY OF THE INVENTION

These and other objects are met, in accordance with the present invention, by a tether comprising a plurality of linearly oriented members with openings therethrough generally parallel to the line of orientation of the members and a control cable extending through these openings. Upon being made taut, the control cable pulls the members together causing frictional engagement of all of the abutting surfaces of adjacent members thus causing the overall tether structure to be rigidified. Conversely, when the control cable is slack, i.e. not taut, the individual members of the tether structure are relatively free to move about their line of orientation and the tether is bendable or flexible. Mating of convex surfaces on each of the members with abutting concave surfaces of adjacent members in the structure enhances the flexibility of the structure, when the control cable is not taut, by facilitating relative movement of adjacent members about their line of orientation and enhances rigidification, when the cable is taut, by increasing the coefficient of frictional engagement of adjacent members. Concave-convex abutting surfaces on adjacent members also enable the tether to be rigidified in a curvilinear as well as a straight linear orientation. Other types of mechanical engaging means, such as deformable surfaces or spring locks, may be incorporated in the abutting surfaces of adjacent members either to improve the engagement or to prevent the disengagement thereof.

In one embodiment of the present invention, the tether is provided with a plurality of control cables, disposed parallelly at a distance from one another and from the axial center of the tether. One end of this tether may be manipulated by the selective tensioning of less than all of these control cables.

In preferred form of the present invention, a mechanical means is provided for limiting the movement of adjacent members away from each other. Typically this mechanical means is a lip on the concave surface of an abutting member which fits over an abutting convex surface with which the concave surface is mated. Thus in the event of failure of the control cable, such as by breakage or a mechanical foul up preventing the cable from being made taut, the overall structure does not seaprate and the tethered body remains connected to the vehicle.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

FIG. 1 is a schematic illustration of the essential elements of the present invention in the preferred embodiment thereof;

FIG. 2 is an illustration of the manipulatable embodiment of the present invention; and FIG. 3 shows a variable flexibility tether assembly in which the present invention is incorporated.

Referring more specifically to FIG. 1 there is shown, schematically and in cross section, a plurality of linearly oriented members 10 with axial openings 12 therethrough and, on opposite ends thereof, convex surfaces 14 and concave surfaces 16. A control cable 18, extending through axial openings 12 of members 10, is provided to rigidify the overall structure when the cable 18 is made taut, by pulling each of the convex surfaces 14 of members 10 into frictional engagement with abutting concave surfaces 16 of adjacent members 10. When cable 18 is not taut, each of the members 10 is free to move about the line of orientation of members 10 and the tether structure comprised generally of members 10 and control cable 18 is therefore flexible. Necessarily, one end of control cable 18 is connected to a terminal member of the tether structure which is attached to or a part of the body or vehicle to be tethered.

It will be noted that the line of orientation of members 10 need not be a straight line. When cable 18 is made taut, adjacent members 10 will be frictionally engaged along that line whether it is straight or curvilinear.

As shown in FIG. 1, in the preferred embodiment of the present invention, each member 10 includes a lip 20 which fits over abutting convex surfaces 14 preventing the complete separation of adjacent members 10. Thus in the event of breakage or failure of control cable 18, the integrity of the tether remains intact, preventing the complete separation of tethered bodies which would otherwise occur.

Looking now to FIG. 2, there is shown a portion of a manipulatable tether 22 which differs structurally from that shown in FIG. 1 by the inclusion of a plurality of openings 21 through each of the members 10 with a plurality of control cables 18 extending therethrough. The plurality of openings 21 and the plurality of control cables 18 through these openings are disposed generally parallel to the axis or line of orientation of the members 10 of the tether but not along the axial center of the tether. In a typical configuration, these openings and cables define an equilateral triangle extending through the tether. Manipulation of one end of tether 22, the free end, from the opposite end thereof, the control end, is effected by tensioning or making taut less than all of the control cables 18. For example, when one of the three control cables 18 in tether 22 is made taut the axis of tether 22 tends to curve toward the taut cable. Similarly, if two of the three control cables 18 are made taut the axis of tether 22 tends to turn toward both of the taut cables.

In FIG. 3, there is shown an assembled non-manipulatable variable flexibility tether 23 including a plurality of members 10 partially encased in sheath 24, an attaching fixture 26 at one end of the tether and a hand held trigger-type mechanical tensioning device 28. In operation, the attaching fixture 26 is generally attached to a space or underwater vehicle and serves as one terminus of the tether, including an attachment both to the end member 10 of the tether and to the control cable extending through the tether.

A man whose mission includes, for example, movement about the vehicle would hold tensioning device 28 and be attached through flexible tether 23 to the vehicle. When he wished to stop or retard his movement about the vehicle, he would squeeze the trigger of tensioning device 28, applying tension to the control cable, not shown in FIG. 3, through tether 23, thereby causing frictional engagement of each member 10 with adjoining members.

In other embodiments of the present invention, the mechanical trigger-operated hand held tensioning device 28 is replaced by hydraulic or electrical tensioning devices so that rigidification or manipulation of the tether may be effected more quickly and more easily and, if necessary, from a remote location. Similar tensioning devices may be used to selectively tension less than all of the control cables of the manipulatable form of the present invention.

While the present invention has been described with reference to particular embodiments thereof for purposes of clarity and convenience, it should be understood that numerous modifications may be made by those skilled in the art without departing from the invention's true spirit and scope. Therefore the appended claims are intended to cover all such equivalent variations as come within the true spirit and scope of the present invention.

What I claim as new and desire to secure by Letters Patent of the United States is:

1. A variable flexibility tether comprising
   (I) a plurality of linearly oriented structural members, each
      (a) having an opening therethrough generally parallel to said line of orientation,
      (b) having a concave abutting surface on one end thereof, and
      (c) having a convex abutting surface on the opposite end thereof,
      (d) disposed with its concave surface abutting the convex surface of an adjoining structural member, and
   (II) a cable which extends through the openings in said members, and is attached to one end of said tether whereby tensile force applied to the opposite end thereof is resisted by a force transmitted through all of said linearly oriented members causing said members to become mechanically engaged with adjacent members and said tether to become rigidified, and
   (III) means at both ends of said tether for fixedly attaching bodies thereto.

2. A variable flexibility tether, such as that recited in claim 1 wherein each of said linearly oriented members includes a plurality of parallel openings therethrough each disposed at some distance from one another and from the center line of said tether, and a plurality of cables extending through said plurality of openings whereby one end of said tether may be manipulated by the application of tensile forces to less than all of the plurality of cables.

3. A variable flexibility tether, such as that recited in claim 1, wherein said adjacent members become frictionally engaged upon application of a tensile force to said cable.

4. A variable flexibility tether such as that recited in claim 1 further including means for restraining the separation of adjacent elements beyond the limited amount of movement necessary to preclude mechanical engagement of adjacent members.

5. A variable flexibility tether such as that recited in claim 4 wherein said restraining means comprises a lip on a surface of one of said members abutting an adjacent member, said lip extending over the abutting surface of said adjacent member.

6. The method of controllably restraining the movement relative to a first body of a three-dimensionally movable second body comprising applying, from one of said bodies, a tensile force as necessary to effect movement restraint to a cable attached at one end to the end member of a plurality of members through which said cable passes which end member is attached to the other of said bodies whereby said plurality of members are mechanically engaged.

References Cited
UNITED STATES PATENTS
3,096,962   7/1963   Meijs _____ 74—501

FOREIGN PATENTS
40,783   5/1932   France _____ 74—501

WESLEY S. RATLIFF, Jr., Primary Examiner